Inventor,
Ernest B. Shackford,
by Vale P. Nyles
His Attorney.

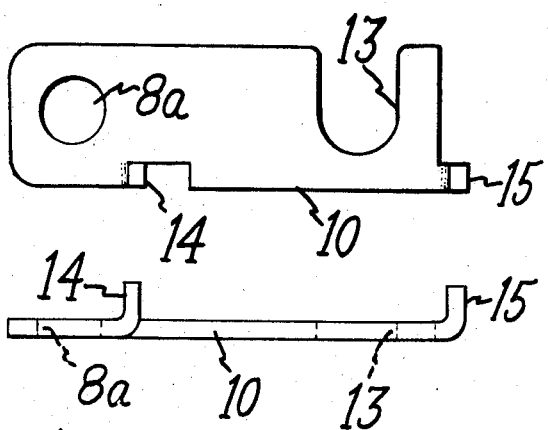
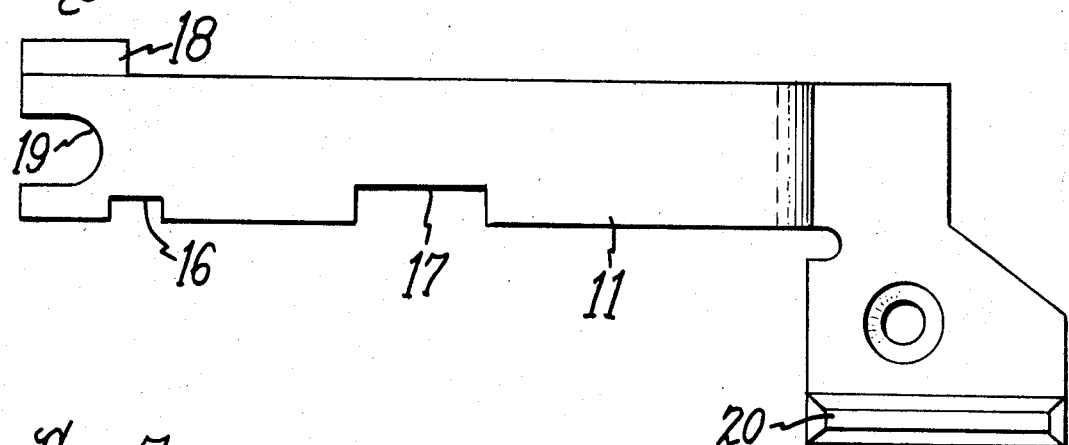
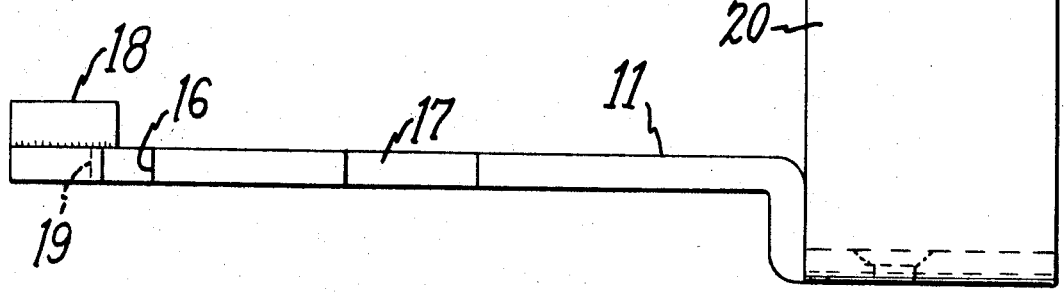

United States Patent Office 3,562,695
Patented Feb. 9, 1971

3,562,695
TERMINAL AND BUS BAR CONSTRUCTION FOR WATT-HOUR METERS
Ernest B. Shackford, Berwick, Maine, assignor to General Electric Company, a corporation of New York
Filed Jan. 31, 1969, Ser. No. 795,591
Int. Cl. H01r 29/00
U.S. Cl. 339—31                                        12 Claims

ABSTRACT OF THE DISCLOSURE

A pair of interlocking bus bars are provided for a watt-hour meter to eliminate risk of short circuiting meter components when one of the bus bars, which has an integral terminal on it, is connected to the meter to convert it from a four terminal meter to a five terminal meter. The interlocking means of the respective bus bars prevent the fifth terminal from being placed in operating position while the first bus bar is serving as a test link connected between two terminals on the meter base plate.

---

This invention relates to means for efficiently and safely implementing the conversion of a watt-hour meter provided with a meter base plate having four meter terminals projecting therefrom to a base plate having five meter terminals projecting therefrom.

It is often desirable to convert a watt-hour meter that has been installed on either a two-wire or three-wire system so that it will operate respectively, on a three-wire or two-wire system. It is common practice in the electric utility industry to effect such a conversion by adding a fifth terminal to the base plate of a conventional meter that is already adapted to function with four terminals. As is well known in the field, it is standard practice to arrange the four basic meter terminals of a watt-hour meter at the four corners of a rectangle on the meter base plate. When a fifth terminal is provided on such meters, the fifth terminal is, pursuant to standard practice in the industry, located midway between two of the four main terminals already in place on the base plate.

Prior to the invention disclosed herein, it has been common practice in converting a watt-hour meter having four terminal blades to a meter with five terminal blades, to rely on the experience of the metermen making the conversion to make sure that the meter's existing test link is opened before the fifth terminal is connected to one of the terminal posts between which the test link is normally connected. If the meterman fails to open this test link circuit, when the five terminal meter is plugged back into the system being metered, a short circuit exists between the connected test link terminals and one of the current terminals. Such a short circuit may do extensive damage to the meter and the system to which it is connected. Therefore it is desirable to remove, to the extent possible, the likelihood or possibility of human error occurring when such a meter is converted from four terminal to five terminal operation.

It is, accordingly, a primary object of this invention to provide improved means for implementing conversion of a watt-hour meter having a given number of terminal blades thereon to a meter having a different number of terminal blades.

Another object of the invention is to provide means for insuring against the possibility of a short circuit occurring when a watt-hour meter is converted from a four terminal meter to a five terminal meter.

Yet another object of the invention is to provide means for quickly and safely converting a watt-hour meter from two-wire operation or three-wire operation to, respectively, three-wire or two wire operation.

Still another object of the invention is to provide combination bus bar and terminal means for a watt-hour meter that afford a safe and simplified means for changing the number of active terminal blades on the meter while requiring a minimum amount of time and the use of only a simple screwdriver to effect such a conversion.

Another object of the invention is to provide bus bar locking means for a watt-hour meter base plate to assure the permanent positioning of bus bars in a predetermined arrangement while at the same time affording ready conversion of the meters terminal blade arrangement if desired.

In one preferred embodiment of the invention, a watt-hour meter base plate is provided with a test link bus bar that is adapted for connection between a pair of electroconductive terminals mounted on and extending through the base plate. Thetest link bus bar is provided with two lugs that are adapted to: (1) prevent a fifth terminal blade from being electrically connected to one of the test link terminals and (2) to retain the test link terminal bus bar in a predetermined position after the fifth terminal is connected to the test link terminal. In addition, a fifth terminal having an integral bus bar portion is provided and a lug is disposed on this bus bar portion to prevent the fifth terminal from being inserted into electrical contact with the test link terminal when the test link bus bar is in simultaneous electrical contact with the two terminal posts. The lug on the terminal plate bus bar portion also serves to retain the test link bus bar out of contact with one of the pair of terminals when this bus bar portion is connected in a predetermined manner to one of the test link terminal posts.

The above mentioned and other features and objects of this invention and the manner of attaining them will become more apparent and the invention itself will be best understood by reference to the following description of an embodiment of the invention taken in conjunction with the accompanying drawings, wherein:

FIG. 4 is a top view of the test link bus bar shown in FIG. 1.

FIG. 5 is a side view of the bus bar shown in FIG. 4.

FIG. 6 is a top view of the combination fifth terminal and bus bar illustrated in FIG. 1.

FIG. 7 is a side view of the combination terminal and bus bar shown in FIG. 6.

Figure 1:
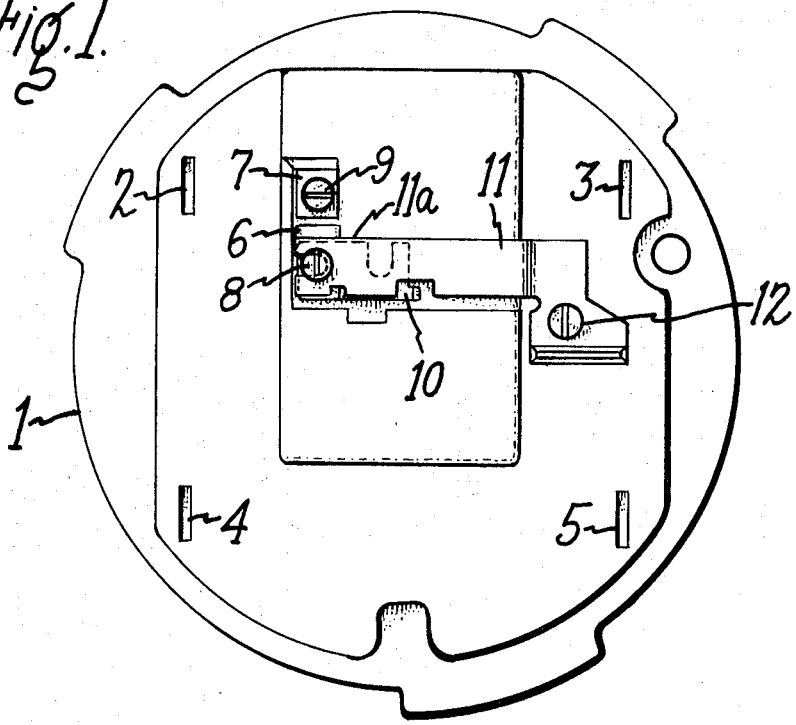
FIG. 1 is a top view of a meter base plate showing a test link bus bar and a combination fifth terminal and bus bar constructed pursuant to the teaching of the present invention.

Referring now to FIG. 1 of the drawing, there is shown a meter base plate 1, which it will be understood is adapted for use in conjunction with a watt-hour meter or other similar metering device. The base plate 1 may be formed of any suitable, high impact, insulating material that is adapted to be readily molded or machined into predetermined configurations. The base plate 1 is provided with four terminal blade receiving apertures, 2, 3, 4 and 5, disposed at the four corners of a rectangle. When the meter is plugged into a conventional meter socket, terminal blades will extend through the respective apertures 2–5 and be engaged by the terminal jaws mounted on the socket. A pair of terminal posts 6 and 7 formed of a suitable electroconductive material are permanently mounted on the base plate 1 and extend through the base plate to preformed electrical terminals on the opposite side thereof in a manner well understood in the watt-hour meter field. Both of the terminal posts 6 and 7 are provided with flat upper surfaces as illustrated in FIG. 1, and the center of each of these surfaces is tapped with a threaded aperture adapted to receive, respectively, screws 8 and 9. In the preferred embodiment of the invention, the screws 8 and 9 are formed of brass, but any suitable conductive material may be utilized for these elements. Thus far, the components discussed with reference to FIG. 1 are relatively conventional and do not, by themselves, form a critical part of the present invention.

As noted above, it is common practice to provide a test link bus bar to form an electroconductive path between terminal posts 6 and 7 in a watt-hour meter arrangement of the four terminal type, such as that discussed thus far. Pursuant to the present invention, a novel form of bus bar 10 is shown in FIG. 1 connected at one of its ends to the top, flat surface of terminal post 6 between that surface and the head of screw 8. Also shown in FIG. 1 is a combination fifth terminal and bus bar 11. The bus bar portion 11a of this combination element is also depicted as secured to the top surface of bus bar 10 under the head of screw 8. A second screw 12 is tapped into an aperture in the upper surface of base plate 1 through an aperture in the combination terminal and bus bar 11 to provide means for retaining this element securely in position once it is connected as shown in FIG. 1.

Figure 2:
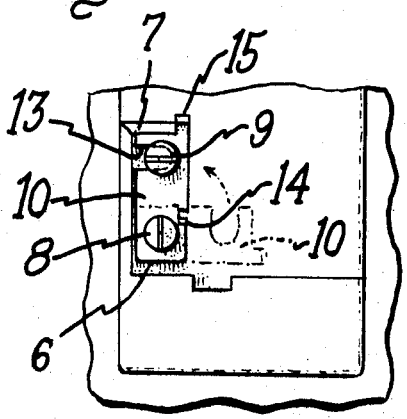
FIG. 2 is a fragmentary top view of the test link terminal post and test link bus bar illustrated in FIG. 1.

Before proceeding with the description of the novel features of bus bars 10 and 11 it will facilitate an understanding of the invention if reference is made to FIG. 2 of the drawing in which elements similar to those shown in FIG. 1 are designated by like numerals. Thus test link bus bar 10 is shown connected between screws 8 and 9 and secured in electrical contact with the terminals 6 and 7. It will be noted that the bus bar 10 is pivotally mounted on the screw 8 and is adapted to be pivotally moved about this screw into and out of electrical contact with terminal post 7. Specifically, a slot or channelway 13 is provided extending from one side of the bus bar 10 toward the center thereof to provide means whereby the undersurface of bus bar 10 can be complimentarily fitted against the upper surface of terminal post 7 when the bus bar 10 is pivoted around the screw 8 into electrical contact with post 7.

An appreciation of the significance of the present invention will be had when it is understood that in normal usage of watt-hour meters it is common practice to have the test link 10 connected across the terminal posts 6 and 7 as shown in FIG. 2 when the meter is intended for use with a system that employs only the four terminal blades that are adapted to project through slots 2 through 5. In order to convert the meter base plate 1 to a five terminal arrangement, as shown in FIG. 1, it can be seen that the combination terminal and bus bar 11 can either be placed in position on terminal post 6 above bus bar 10, as shown in FIG. 1, or it may be inserted in position under bus bar 10, as shown in detail in FIG. 3. Thus, in order to prevent connection of the combination terminal and bus bar 11 to the terminal post 6 when bus bar 10 is simultaneously connected to terminal posts 6 and 7, it is necessary to provide means for preventing the combination bus bar and terminal 11 from being either positioned above or below the bus bar 10.

In order to understand exactly how this desirable objective is attained by the present invention, reference is made to FIGS. 4 through 7 of the drawings. FIGS. 4 and 5 are enlarged detailed views of the test link bus bar 10 and it can be clearly seen that in addition to the slot 13 adapted to encompass the threaded post of the screw 9, the bus bar 10 is provided with an aperture 8a that is large enough to accommodate the shaft of screw 8 so that the bus bar 10 may be mounted for pivotal movement about the screw 8. Moreover, bus bar 10 is provided with a first lug means 14 and a second lug means 15 projecting upwardly from one surface thereof as clearly seen from FIG. 5. In the preferred embodiment of the invention these lug means 14 and 15 are formed by stamping the metal bus bar 10 to bend portions thereof into the form of lugs 14 and 15, but it will be appreciated by those skilled in the art that other suitable lug means may be utilized without departing from the scope of the invention. The particular purpose and operation of lugs 14 and 15 will be discussed at greater length below. However, prior to that discussion, reference is made to FIGS. 6 and 7 to describe the unique details of the combination terminal blade and bus bar 11.

It will be seen with reference to FIG. 6 that the bus bar portion 11a, of the combination terminal blade and bus bar 11, is provided with two slots 16 and 17. As will become apparent during the subsequent discussion of the invention, these slots are not critical to the effective operation of the invention, but they afford an optimum design that allows bus bar 10 to be axially aligned with the longitudinal axis of the bus bar portion 11a of combination terminal blade and bus bar 11 due to the fact that slots 16 and 17 are positioned to receive lugs 14 and 15, respectively, when the bus bars 10 and 11a are in the position illustrated in FIGS. 1 and 3. An important feature of the combination terminal blade and bus bar 11 is the integral lug 18 provided on the bus bar portion 11a adjacent the end thereof having slot 19 therein. Of course, slot 19 provides means for positioning the bus bar portion 11a in contact with the upper surface of terminal post 6 or the upper surface of the bus bar 10 when the combination terminal blade and bus bar 11 are positioned in the arrangement shown in FIGS. 1 and 3. Finally, the combination terminal blade and bus bar 11 includes the terminal blade 20 projecting upward at a 90° angle from the surface of the bus bar portion 11a. For given applications it is obvious that the particular configuration of the terminal blade and bus bar 11 may vary, but it will be apparent to those skilled in the art, from the following description of the invention, that regardless of such changes in the more conventional structural features of the combination terminal blade and bus bar 11 or the test link bus bar 10, certain critical relationships must be maintained with regard to lugs 14, 15 and 18 to afford the unique method of operation provided by the present invention.

Figure 3:
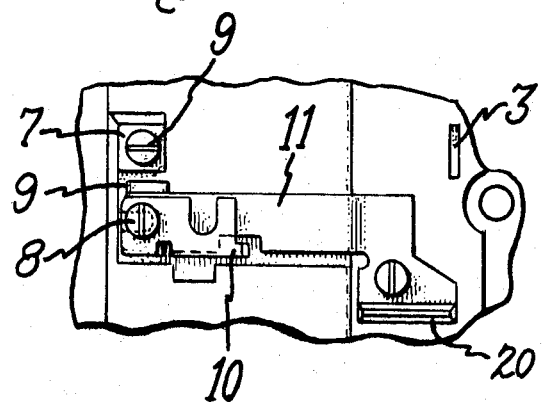
FIG. 3 is a fragmentary top view of the combination fifth terminal and bus bar construction shown in FIG. 1 but depicting the respective bus bars in a different position.

The purpose and function of the present invention will be better understood from a description of its operation. Again, it should be recalled that a primary objective of the invention is to allow rapid and safe conversion of the meter base construction shown in FIG. 1 to change it from four-terminal blade operation to five-terminal blade operation. To accomplish such a result, it is necessary to make sure that test link 10 is disconnected from its normal arrangement as shown in FIG. 2 before a fifth terminal 20 is put in place by bus bar portion 11a being screwed into position on terminal post 6. In order for a meterman to connect the combination terminal blade and bus bar 11 to terminal post 6, it is necessary for him to partially remove, or to loosen screw 8 so that slot 19 may be inserted around the sides of screw 8 and the sides of the slot 19 under the head of screw 8. When screw 8 is loosened in this manner, the bus bar portion 11a may be connected to terminal post 6 by inserting the bus bar portion 11a under bus bar 10 as shown in FIG. 3, or over bus bar 10 as shown in FIG. 1. Now referring to FIG. 2, it can be seen that lug 14 will block or prevent the insertion of bus bar 11a under the head of screw 8 when bus bar 10 is in the connected position shown in FIG. 2. On the other hand, when bus bar 10 is pivotally moved to the position shown in phantom in FIG. 2, or shown in detail in FIG. 1, the slot 19 of bus bar portion 11a can be easily slid around the shank of screw 8 and clamped into position as shown in FIG. 1. In the event that the meterman had attempted to insert slot 19 into position around screw 8 by sliding bus bar portion 11a under bus bar 10, the lug 18 on bus bar portion 11a would be blocked by the side of bus bar 10 and thus prevent the bus bar 11a from being moved into a seated position on terminal post 6. Accordingly, it can be seen that the combined action of lug 14 on bus bar 10 and lug 18 on bus bar portion 11a prevent the connection of fifth terminal 20 to the terminal post 6 on base plate 1 until the test link bus bar 10 has been pivoted to a fully disconnected position from terminal post 7. In practice, such a safety procedure, when used on conventional watt-hour meters, serves to insure against a short circuit occurring when a meter is converted from three-wire to two-wire service by the foregoing conversion from four-terminal to five-terminal operation.

A further important advantage of my invention is that it serves to prevent the inadvertent closing of the test link bus bar 10 to complete a circuit between terminal posts 6 and 7 after combination terminal blade and bus bar 11 is secured in position on terminal post 6. Again, since it is possible to connect the bus bar portion 11a either above or below bus bar 10 as shown, respectively, in FIGS. 1 and 3, the lug means of the invention must necessarily be adapted to provide the desired retaining action for both of these contingencies. Referring first to FIG. 1 of the drawing, it will be seen that when the bus bar 10 is secured in position under the bus bar portion 11a of combination terminal blade and bus bar 11, lugs 14 and 15 of bus bar 10 are positioned in slots 16 and 17, respectively, of bus bar portion 11a. Thus, when screw 8 is tightened to afford good electrical contact between bus bars 10 and 11a and terminal post 6, lugs 14 and 15 prevent bus bar 10 from being pivotally rotated into a position where slot 13 in bus bar 10 could be secured under the head of screw 9. Considering the case in which the combination bus bar and terminal blade 11 are secured in position to terminal post 6 under bus bar 10, as shown in FIG. 3, it will be seen that lug 18 on bus bar portion 11a engages the side of bus bar 10 to prevent it from being pivoted into electrical contact with terminal post 7. Therefore, regardless of whether the bus bar 10 is positioned above or below bus bar portion 11a, it is prevented from being inadvertently pivoted into contact with terminal post 7 once bus bar portion 11a is secured to terminal post 6.

While the foregoing description sets forth the principles of the invention in connection with a specific embodiment thereof, it is to be understood that this description is made only by way of example and not as a limitation of the scope of the invention as set forth in the objects thereof and in the accompanying claims.

What I claim as new and desire to secure by Letters Patent of the United States is:

1. In combination with a meter base plate having a pair of terminals each adapted to have one or more bus bars connected thereto, a first bus bar adapted to be electrically and mechanically connected to each of said terminals simultaneously to afford a current conducting path therebetween, a second bus bar adapted to be connected to one of said terminals, and means for preventing said second bus bar from being connected to said one of said terminals when the first bus bar is connected to both of said terminals.

2. The invention defined in claim 1 wherein said means for preventing comprises lug means on at least one of said bus bars adapted to block the other of said bars from being connected to one of said terminals when the lug means are disposed in a predetermined position with respect to said terminals.

3. In combination with a meter base plate having a pair of terminals each adapted to have one or more bus bars connected thereto, a first bus bar adapted to be electrically and mechanically connected to each of said terminals simultaneously to afford a current conducting path therebetween, a second bus bar adapted to be connected to one of said terminals, and means for preventing said first bus bar from being connected simultaneously to both of said terminals when the second bus bar is connected to one of said terminals.

4. The invention defined in claim 3 wherein said means for preventing comprises lug means on at least one of said bus bars adapted to maintain said first bus bar in a position electrically disconnected from one of said terminals when the lug means are disposed in a predetermined position with respect to said terminals.

5. A terminal blade and bus bar construction for watthour meters of the socket type, comprising a meter base plate, a pair of electro-conductive terminals extending through the plate, said terminals each having a mounting face with a threaded aperture therein, a first bus bar having a base portion adapted to be secured against each of said mounting faces simultaneously by screws extending through the base portion and into said threaded apertures, a second bus bar having a base portion adapted to be secured in electrical contact with one of said mounting faces by a screw extending through the base portion thereof and into the threaded aperture of said one of said mounting faces, a pair of lugs on said first bus bar projecting from the same side of the base portion thereof, a single lug on said second bus bar adjacent the end thereof adapted to be connected to one of said terminals, one of said pair of lugs and said single lug being effective to prevent the second bus bar from being secured to said one of said terminals by a screw therethrough when said first bus bar is connected to both of said terminals.

6. A terminal blade and bus bar construction as defined in claim 5 wherein the other of said pair of lugs and said single lug are effective to maintain the first bus bar out of electrical contact with one of said terminals when the second bus bar is connected to one of said terminals.

7. A terminal blade and bus bar construction as defined in claim 6 wherein said second bus bar is provided with a terminal blade adapted to be inserted into a resilient terminal jaw.

8. In combination with a meter base plate having a pair of spaced-apart terminals mounted thereon, means for releasably securing one or more bus bars to each of said terminals in electrical contact therewith, a first bus bar adapted to be pivotally secured to one of said terminals and to be pivotally movable into and out of electrical contact with the other of said terminals, a second bus bar adapted to be secured in electrical contact with the one of said terminals to which the first bus bar is pivotally securable, first lug means disposed on said first bus bar in a manner such that said lug means prevents the second bus bar from being secured in electrical contact with one of said terminals and abutting a first side of said first bus bar when the second bus bar is in contact with both of said terminals.

9. In combination with a meter base plate as defined in claim 8, lug means disposed on said second bus bar in a manner such that said lug means prevents the second bus bar from being secured in electrical contact with one of said terminals and abutting a second side of said first bus bar when the second bus bar is in contact with both of said terminals.

10. A combination as defined in claim 8 wherein said first lug means is also effective to prevent the first bus bar from being pivotally moved into simultaneous contact with both of said terminals when said second bus bar is secured to one of said terminals.

11. In combination with a meter base plate as defined in claim 8, second lug means disposed on one of said bus bars in a manner such that said second lug means prevents the first bus bar from being pivotally moved into simultaneous contact with both of said terminals when said second bus bar is secured to one of said terminals.

12. The invention defined in claim 11 wherein said second lug means is disposed on said first bus bar.

References Cited

UNITED STATES PATENTS

| | | | |
|---|---|---|---|
| 2,154,411 | 4/1939 | Road et al. | 317—107 |
| 2,249,075 | 7/1941 | Young et al. | 317—107X |
| 2,805,403 | 9/1957 | Road | 317—108X |
| 2,972,656 | 2/1961 | Fisher | 317—108X |
| 3,136,925 | 6/1964 | Klein | 317—107 |

DAVID H. BROWN, Primary Examiner

U.S. Cl. X.R.

317—107